United States Patent [19]

Danko

[11] 4,429,012
[45] Jan. 31, 1984

[54] LAMINATED WOOD PRODUCTS

[76] Inventor: Peter Danko, 917 King St., Alexandria, Va. 22314

[21] Appl. No.: 284,683

[22] Filed: Jul. 20, 1981

[51] Int. Cl.$^3$ ............................ B32B 3/12; B32B 3/26; B32B 23/10

[52] U.S. Cl. ..................................... 428/12; 156/197; 156/268; 428/60; 428/107; 428/116; 428/119; 428/167; 428/178; 428/182; 428/186; 428/191

[58] Field of Search ...................... 428/12, 47, 52, 55, 428/60, 167, 178, 182, 186, 116, 118, 189, 181, 107; 144/319; 156/197, 268, 266

[56] References Cited

U.S. PATENT DOCUMENTS 4,035,538 7/1977 Maekawa et al. .................. 428/181
4,142,931 3/1979 Viol et al. ............................ 156/268

FOREIGN PATENT DOCUMENTS 55-103949 8/1980 Japan .................................. 428/167

*Primary Examiner*—Paul J. Thibodeau

*Attorney, Agent, or Firm*—Finnegan, Henderson, Farabow, Garrett & Dunner

[57] ABSTRACT

A wood sheet-like product which comprises at least two sheets of wood and a pliable material bonded between the sheets. The wood and pliable material is bonded to form a unitary product and grooves through the wood sheets are spaced at intervals to facilitate bending of the product at the grooves. The sheet-like product is used to make wood honeycomb and corrugated wood by positioning grooves at predetermined locations on the product, bending the product into a certain configuration. In the case of honeycomb, adjacent strips of the product are adhered together in such a way as to form polygonal cells. To make corrugated wood one configuration has a series of high and low ridges secured to a facing skin. The methods of making the wood sheet-like product comprises inserting a pliable material between two sheets of wood bonding the sheets together and cutting a groove through the wood sheets but not through the pliable material.

20 Claims, 5 Drawing Figures

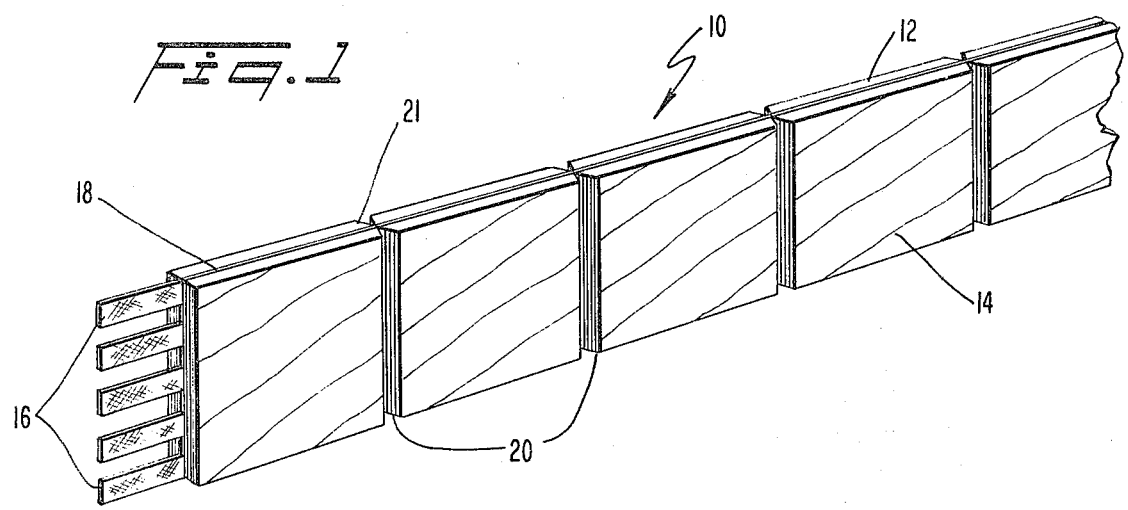
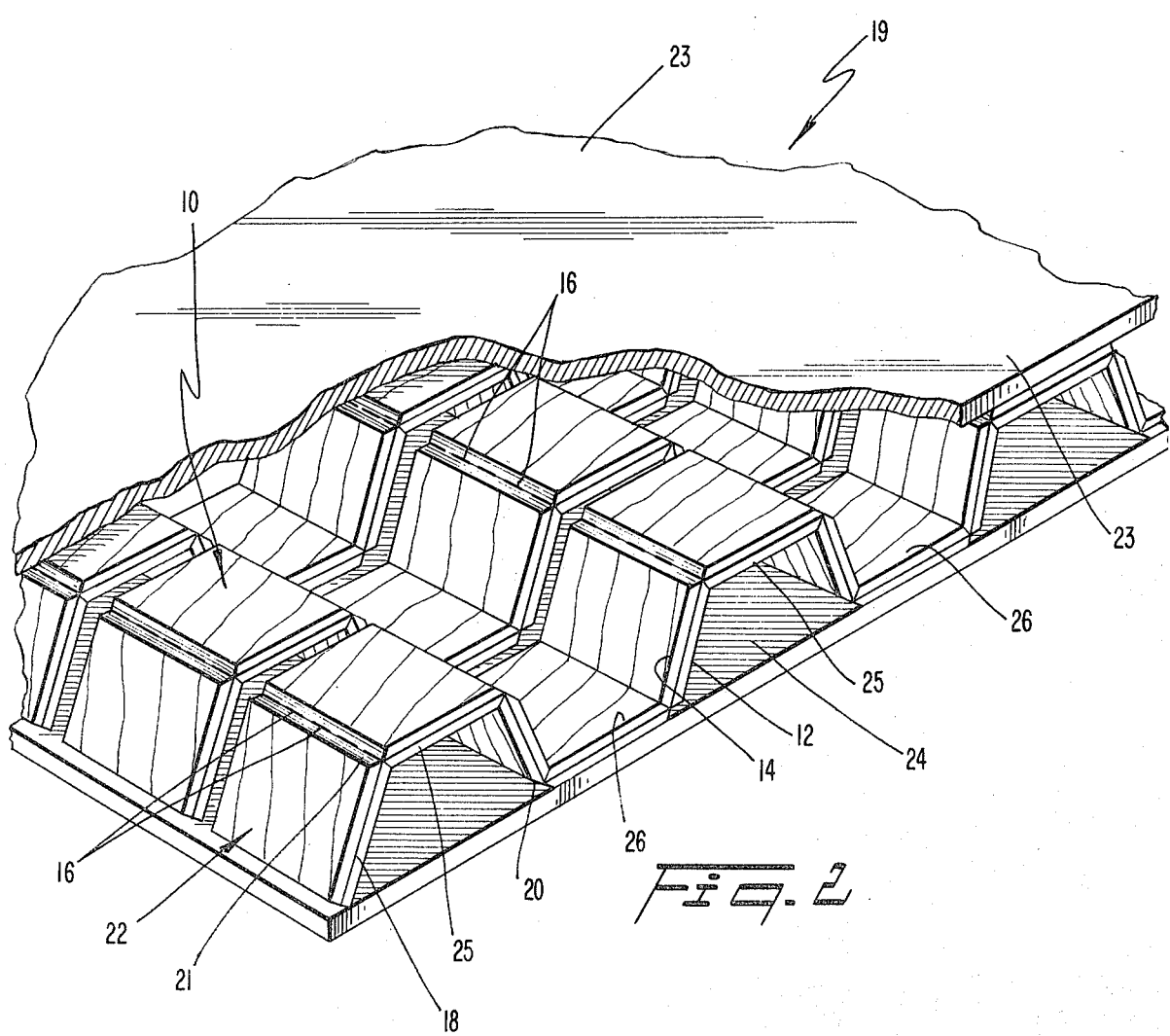

U.S. Patent   Jan. 31, 1984   Sheet 2 of 2   4,429,012
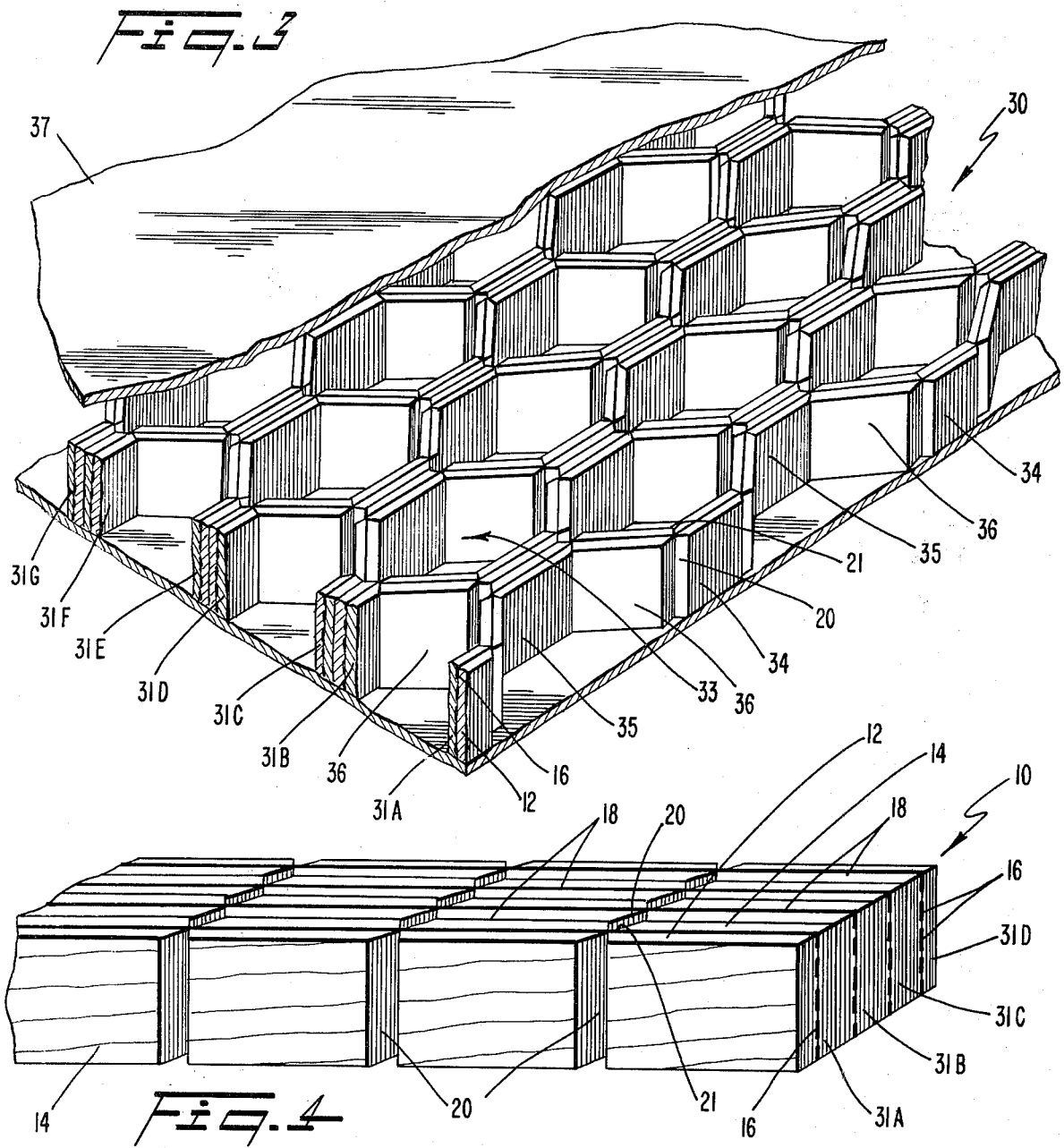
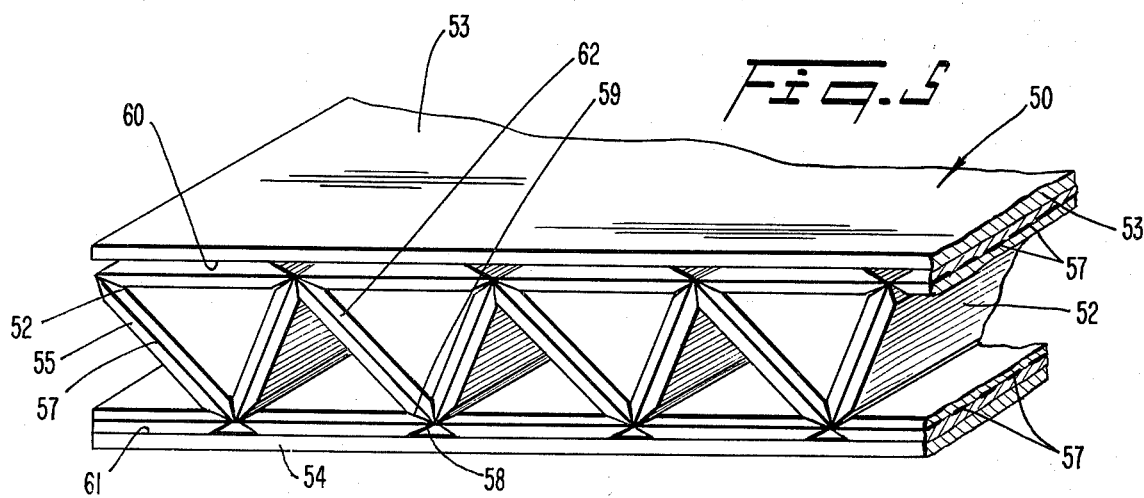

LAMINATED WOOD PRODUCTS

BACKGROUND OF THE INVENTION

The present invention relates to a wood sheet-like product, honeycomb and corrugated constructions made from the product and methods and making the product and the particular constructions. The present invention finds particular utility in making wood honeycomb or corrugated wood assemblies for construction, furniture or other purposes.

For many years it has been known how to make honeycomb and corrugated materials. Such products as corrugated cardboard made of paper and airplane wall and wing panels of metal honeycomb are commonplace. They have achieved widespread use because of their light weight and high strength properties and economy when compared with alternative materials which could be used to accomplish the same purposes. In addition to cardboard or paper, corrugated constructions have also been made from such materials as plastic and textiles. Honeycomb constructions have been made from glass fabrics and metal foils as well as sheet metal. The products made from these materials capitalize on the properties of the basic material as well as the corrugated or honeycomb design.

A honeycomb construction can be formed by bending and welding strips of thin lightweight metal to form a core which is then covered with sheets of metal to form a panel. This type of panel capitalizes on properties unique to metal, such as its strength, its ductility, its capability of being welded with strong bonds to itself to create a desirable, although expensive product. A corrugated material, such as cardboard, is used extensively as a packing material. For this use, the product must be strong, lightweight, inexpensive and capable of protecting its cargo from the elements and from damage by handling.

Honeycomb of metal and corrugated constructions of paper are good examples of materials used in a particular mechanical construction to achieve a desirable product. In each case, the product depends both on the physical construction, i.e., the honeycomb or corrugated forms and on the properties of the material used to achieve all of its desirable properties.

A problem in the construction industry has involved the most effective use of a basic building material—wood. Wood is becoming an increasingly scarce commodity because of growing demand. Rising construction costs can be partly attributed to dramatic boosts in wood prices. If a more efficient way could be devised to use wood, the cost of construction could be reduced.

Wood is valued as a construction material for its properties of resistance to weather, its compressive and flexural strength in relation to its weight, its ability to be easily worked, its relatively low cost, and not least, its beauty.

For all of its good qualities, wood does not have the properties of metal, plastic, paper or textiles which enable them to be easily formed into honeycomb or corrugated configurations. It is not ductile like metal or flexible like paper, textiles or certain types of plastics. Instead, wood cracks when it is bent at the angles necessary for such configurations.

SUMMARY OF THE INVENTION

I have discovered that it is possible to make corrugated, honeycomb and similar structures out of wood. It is necessary to make the wood flexible while at the same time retaining the characteristics which make it a valuable construction material. By using thin sheets or segments of wood with flexible materials bonded to them and inducing the wood to bend at desired locations by the use of grooves scored in the wood or at segment joints, it is possible to create a flexible wooden sheet. This material can be produced economically and in large quantities. Due to the inherent properties of wood and the structural advantages of the honeycomb, corrugated or similar configuration which the flexible wooden sheets can be used to make, these products can be used in all of the ways wood is traditionally used but with only a fraction of the material necessary in ordinary construction techniques.

In addition, the product and methods of this invention lend themselves well to constructing such articles as drawers, casework, cabinet doors or other furniture which may require a bend to form the structure or a hinge-like connection to allow the structure to fold or collapse.

In order to achieve the objects and in accordance with the purpose of this invention, as embodied and broadly described herein, a layered sheet-like product is comprised of at least two sheets of wood with a pliable material between the sheets. Means for adhering the sheets together with the pliable material located between them is used to form a unitary product. Grooves on at least one side of the product or predetermined locations facilitate bending the product along the grooves, with each of the grooves penetrating only through the wood sheet on one side of the pliable material. The means for adhering the wooden sheets together may include such expedients as an adhesive material applied to the wood sheets and set under pressure or a bonding substance incorporated in the pliable material which is activated by heat or pressure or a combination of heat and pressure. The purpose is to form a unitary product of two or more sheets of wood with pliable material between at least two of the sheets which, upon scoring grooves in the wood sheets, may be bent along the grooves to achieve a desired configuration.

The wood sheet-like product may be comprised of flexible means bonded between two sheets of wood, the two sheets of wood having grooves in them, where the grooves and the flexible means form hinge-like connections at the grooves.

From the sheet-like material of the invention, a corrugated wood structure may be made which has a core covered by at least one facing skin. The core is made from the wood sheet-like product, having two sheets of wood with a flexible material bonded between the sheets and grooves on the outside surfaces of the product to form hinge-like connections in combination with the flexible material. For such a construction, the grooves on each sheet are at predetermined registering locations in the unitary-sheet-like product. The core has a configuration of a series of alternate high and low ridges or surfaces formed by bending the product along the grooves. A facing skin is adhered to at least one of the series of ridges or surfaces of the core. A second facing skin may also be secured on the opposite series of ridges or surfaces to form a panel.

The wood sheet product of the invention may also be used to construct a wood honeycomb structure. For this type of product, a plurality of sheets of the sheetlike product having grooves out on each sheet in predetermined registering locations on both sides of the sheet are each formed into alternating high and low surfaces by flexing the sheets at the hinge-like connections. The flexed sheets are each adhered to at least one adjacent sheet at contiguous surfaces between predetermined grooves to form a series of polygonal cells between the adjacent sheets.

It is also possible to use this honeycomb structure as a core which has facing sheets adhered to one or both sides of the array of cells.

A method for making the sheet-like wood product would include the steps of inserting a pliable material between two sheets of wood, bonding the sheets together with the pliable material between them and cutting a groove on at least one outside surface of the sheets. In forming strips of the sheet-like product the pliable material, such as a band or ribbon, is inserted in substantially parallel spaced apart configuration between two sheets of wood. After being adhered together with an adhesive material and pressure to bond the pliable material to the wood to form a unitary product, the sheets are cut with grooves, the grooves penetrating through at least one outside surface of the product. The grooves do not pass through the pliable material. Preferably the grooves are oriented perpendicular to the elongated direction of flexible material where a ribbon-like material is used.

In order to make a corrugated wood product from the sheet-like product, grooves are cut in the outside surfaces of a unitary product (i.e., the wood product having at least two sheets of wood having a flexible means bonded between them). The unitary product is bent along the grooves to form an alternating series of high and low surfaces. Then a facing skin is adhered to at least one of the series of surfaces.

A honeycomb wood product may also be made by forming a plurality of laminated sheet-like wood members (each having hinge-like connections) by bonding a flexible material between two sheets of wood. Both surfaces are scored with grooves at predetermined registering locations on both surfaces of each of the sheets. The sheets are bent along the grooves to form a series of mating surfaces on each of the sheets. The mating surfaces of the adjoining sheets are adhered together.

The accompanying drawings, which are incorporated in and constitute a part of the specification, illustrate embodiments of the invention and, together with the description, serve to explain the principles of the invention.

BRIEF DESCRIPTION OF THE DRAWINGS

FIG. 1 is a perspective view of the layered sheet-like product of one embodiment of the invention;

FIG. 2 is a cutaway perspective view of a corrugated wood structure of the invention;

FIG. 3 is a perspective view of a honeycomb wood structure of the invention with a partial cutaway view of the layered sheets and flexible material;

FIG. 4 is a perspective view of a collapsed honeycomb wood structure of FIG. 3;

FIG. 5 is an alternate configuration of a corrugated type wood structure.

DESCRIPTION OF THE PREFERRED EMBODIMENT

Reference will now be made in detail to the present preferred embodiments of the invention, examples of which are illustrated in the accompanying drawings.

The preferred embodiment of the sheet-like wood product of the invention is represented generally in FIG. 1 by 10. This figure shows the layered product comprised of two sheets of wood 12 and 14 which have sandwiched between them a flexible material or flexible means 16 which as depicted in the figure are filamentary. Other appropriate flexible materials may be used, including for example, nylon filament, woven or nonwoven fabric, netting of various materials, bands or ribbons of polyester, polypropylene, rayon, or other flexible materials which can be bonded to the wood sheets. The figure also shows that the wood sheets 12 and 14 are bonded together with an adhesive 18. The wood sheets are made flexible at predetermined points by grooves 20 which facilitate bending of the wood sheet-like product at the grooves.

As can be seen in FIG. 1, the grooves penetrate only through the top sheet of wood and do not sever the flexible means 16 which run the length of the wooden sheets in parallel, spaced apart relationship to each other. The flexible material in combination with the grooves 20 forms a series of flexible hinge-like connections in the wood to facilitate bending of the wooden sheets. Depending upon the thickness of the wood sheets used and the intended use of the sheet-like product, it may be necessary only to score one surface of the sheet-like product to enable the product to be bent at predetermined locations. However, since wood cracks or splinters when it is bent at an acute angle, it is normally advisable and desirable to provide grooves in the wood sheets in corresponding registering locations on both surfaces of the product as shown by grooves 21 matching grooves 20 on the opposing surface of the unitary sheet-like product. Wood sheets having a thickness of from about 1/30 inch to 2 inches are generally found to be most usable with this invention. The wood used to sandwich the flexible material may consist of just two sheets or multiple sheets. For example, to construct a light weight packing material two layers of veneer 1/30 inch thick can be bonded together with a fabric or netting between them. Sheets may also comprise multilayer wood constructions such as plywood. It is useful to have a fairly soft wood such as poplar on either side of the flexible material since it compresses more easily around the flexible material to lock it in place. Depending upon the intended purpose of the product, the wood used may be chosen for its appearance, strength, cost, etc., and may include such woods as oak, poplar, cherry, fir, pine or basswood. Particular success has been experienced with poplar and pine because of their softness.

In order to form and make the fullest use of the hinge-like connections, it is essential that the flexible material and the sheet or sheets of wood become a unitary product. Therefore, the bonding of the pliable material in place between the sheets of wood forming the product is essential in the construction of the product. The bonding need only be a mechanical bond holding the flexible or pliable material in place and not a chemical bond of this material to the wood. The smooth surface of some types of pliable material such as polypropylene bands can be made more useful for this invention by texturing the surfaces. This creates an area for the wood to grip the flexible material and enables a strong bond preventing the flexible material from pulling out. The bond of wood to wood in the areas between flexible straps provides the strong bond with the wood compressing around the straps to lock them in place.

As embodied herein, the means for adhering the sheets together with a pliable member between to form a unitary product include an adhesive, or a pliable material which has properties enabling it to adhere to the surrounding sheets of wood either by the application of pressure or heat or a combination of pressure and heat. The means for adhering the sheets preferably includes a combination of an adhesive and pressure.

The sheet-like product described above may be used to produce various other structures. These include a corrugated wood structure, as depicted in FIG. 2, generally as 19 which has a core 22 and surface skins 23 and 24. The corrugated core is made from the layered sheet-like product of the invention including two layers of wood with a flexible material bonded therebetween. The two wood sheets 12 and 14 have grooves 20 in one sheet of wood and grooves 21 in the other sheet of wood. The flexible material 16 bonded between the sheets forms hinge-like connections at the grooves. The core has a configuration of a series of alternate high and low surfaces designated as 25 and 26 respectively. These surfaces are formed by bending the product along the grooves 20 and 21. The surface skin 23 is adhered to the series of high surfaces 25 and skin 24 to the low surfaces 26. This configuration may be used to form a relatively thin product of great strength using a minimum amount of wood.

The core may also be described as being formed of a series of consecutively inverted trapezoid shaped sections, each section having one open and one closed nonequilateral side. As shown in FIG. 2, element 25 is the closed nonequilateral side of one trapezoid shaped section and element 26 is the closed nonequilateral side of the consecutive inverted trapezoid shaped section. Opposing elements 25 and 26 are the open nonequilateral sides of the trapezoid shaped sections. The elements joining elements 25 and 26 are the equilateral sides of each trapezoid shaped section. The surface skin, e.g. 23, is adhered to one nonequilateral side of the trapezoid shaped sections.

The corrugated wood structure may contain a flexible layer such as a plurality of nylon lines, flat polyester bands, or a sheet of fabric such as nylon netting or screening material, or whatever fabric meets the demands of the job to which the corrugated structure will be put. A structure which will have long term structural duties would necessarily require a more durable flexible material compatible with the life of the product than a throw-away type of article such as a packing carton.

The sheet-like wood product as described above may also be used to make other configurations of products such as a honeycomb wood structure. A honeycomb structure, as depicted in FIG. 3, is made from a plurality of sheets of the sheet-like product having grooves on each of the sheets at predetermined registering locations on both sides of the product. The honeycomb product is depicted generally as 30 and illustratively has seven strips of the sheet-like product, 31A through 31G scored at predetermined locations on both sides of the sheets 31 and adhered together at predetermined locations to form a series of hexagonal cells 33. However, alternate arrangements of scoring of the grooves in the sheet-like product may be used to produce various polygonal cells such as triangles, squares, hexagons, etc. Each of the plurality of sheets 31 is flexed at the grooves 20 and 21, which are corresponding registering grooves on each side of the sheet-like product. The sheets, when flexed, form a series of high surfaces 34 and low surfaces 35 with linking surfaces 36. Each of the sheets 31 is adhered to an adjacent sheet 31 at the contiguous surfaces of the high and low points, i.e., low surfaces 35 on sheet 31A are attached to adjacent sheet 31B at its high points 34 and sheet 31B is attached at its low points 35 to the high points 34 on sheet 31C. By adhering these adjacent sheets to the contiguous surfaces of the predetermined surfaces of the adjacent sheet, a series of polygonal cells are formed between the adjacent sheets.

This honeycomb structure 30 may be considered a core which may have a skin such as 37 adhered to it on one or both surfaces to enclose the cells. In forming the honeycomb structure from the sheet-like wood products, the wood product is in the shape of strip-like members 31A through 31G each of which is comprised of at least one strip of wood 12 which has a flexible layer 16 bonded to its surface. Each strip has a plurality of grooves 20 substantially perpendicular to its longitudinal direction for facilitating bending of the wood at the grooves. The strip-like members are bent at the predetermined grooves to form alternate high and low points, the adjacent strip-like members, after bending, form an array of adjacent strip-like members which are adhered to one another at adjacent surfaces between predetermined grooves 20. The surface of the honeycomb structure may be covered by one or more skins of material 37 to enclose the cells of the structure. The grooves 20 and 21 in the strip-like members 31 may be regularly spaced apart and parallel to each other with a facing sheet 37 being adhered perpendicular to the grooves 20 and 21.

A unique feature of the honeycomb form is that, due to the flexible joints of the cells, it is possible to fold up the structure into a flat configuration as depicted in FIG. 4. The strip-like members 31A through G collapse flat against each other closing the spaces of the cells 33. With this feature, it is possible to ship large segments of honeycomb in a very small space and the facing sheets 37, if any are used, may be applied to the honeycomb structure at the site where the material is to be assembled. For example in housing construction, a honeycomb segment may be used as a wall panel with skins of plywood or other material applied to it during construction of the building.

Alternate forms of corrugated material may also be manufactured as shown in FIG. 5. The corrugated panel 50 has a core 52 and surface skins 53 and 54. The core 52 is comprised of the sheet-like product having two layers of wood 55 and 56 with a pliable member 57 bonded between these sheets. The sheet-like product is scored with grooves 58 and 59 at corresponding registering locations on each side of the product and folded in a configuration resembling a Z with an upper surface 60 and a lower surface 61 and a return segments 62 spanning the distance between the upper and lower surfaces 60 and 61. The corrugated core 52 shown in FIG. 5 may also be described as a series of consecutively inverted equilateral triangles having equal length sides 60, 61 and 62. There is an apex of each triangle formed, e.g. by sides 62, where the grooves 58 or 59 of adjacent triangles meet. Where the adjacent triangles meet, four separate segments fit together as shown in FIG. 5 to provide a very stable interlocking arrangement. There are also other configurations of a core which could be manufactured for use in a corrugated construction with the sheet-like product.

One method of assembling the sheet-like product of this invention is to insert a pliable material between two sheets of wood, bond the sheets together with the pliable material between them and cut a groove on at least one outside surface of the sheets. As depicted in FIG. 1, two sheets of wood 12 and 14 are assembled with a pliable material 16 being laid on sheet 14 and an adhesive 18 being applied to facing surfaces of both sheets. In this illustration, the pliable material is depicted as filamentary elements such as polyester ribbons running the length of the wooden members 12 and 14 and substantially parallel to each other. After the two layers of wood 12 and 14 have been assembled with the pliable material 16 and the adhesive 18, grooves 20 and 21 are scored in a desired pattern into the wooden sheets. In some applications and with some types of wood it may be necessary only to provide grooves in one sheet of wood. The grooves penetrate through the wood sheet or sheets but do not cut through the pliable material 16. In FIG. 1, the grooves are cut perpendicular to the pliable filament material 16.

Where grooves are to be cut in both wood sheets, it is advisable to cut the groove at registering locations on both sides of the unitary product after the wood sheets are assembled so that each groove, in combination with the flexible material, forms a hinge-like connection allowing for the bending of the product along the grooves.

The wood sheet-like product as assembled may be used for forming a variety of different constructions. As shown in FIG. 2, corrugated wood structures may be made from the sheet-like wood product by cutting grooves at predetermined registering locations 20 and 21 on product 10. After cutting the grooves, the wood sheet product is bent at each groove to form an alternating series of high surfaces 25 and low surfaces 26. The final step of making a corrugated product is to adhere to facing skin 23 to at least one of the series of surfaces or ridges 25 or 26 (or as illustrated in FIG. 5 surfaces 60 or 61). It is also possible to adhere a facing skin to both the high surfaces 25 and the low surfaces 26 to form a completely enclosed core.

A honeycomb wood product may also be made from the sheet-like wood product by forming a plurality of laminated sheet-like wood members having hinge-like connections as in FIG. 1. As depicted in FIG. 3 for illustrative purposes, the seven strips of sheet-like wood product 31A-31G are scored with grooves at predetermined registering locations 20 and 21 on the opposing sheets of the sheet-like product. The members 31A-31G are then bent along the grooves to form a series of mating surfaces on each of the sheets. The mating surfaces are those surfaces which will adjoin a surface on an adjacent one of the plurality of the sheets 31A-31G. As illustrated, the surfaces 35 on each sheet will mate with the corresponding surface 34 on an adjacent sheet and when joined will form a series of hexagonal cells 33 when the mating surfaces 34 and 35 are adhered together. It should be recognized that the sheets 31A-31G can be increased in number and dimensioned to a size to provide depth, breadth and length of honeycomb desired. Additionally, the grooves can be scored in the product to form cells of various polygonal shapes.

The wood sheet-like product of this invention may also be described as a laminated product having a plurality of segments of thin wooden sheets arranged linearly edge-to-edge as shown in FIG. 1 by segments 12. A like number of like segments 14 are aligned back-to-back and correspondingly positioned to the first plurality of segments 12. Sandwiched between the segments 12 and 14 is an unbroken length of flexible material 16 which forms hinge-like connections between consecutive segments when the segments 12 are bonded to the segments 14. The segments may have chamfered or beveled edges along each adjoining edge in order to provide a better flexibility in bending.

A method of producing the laminated sheet product would comprise the steps of aligning a plurality of the desired shaped segments of thin wood sheets linearly edge-to-edge, aligning a like number of like dimensioned segments back-to-back and correspondingly positioned to the first plurality of segments, inserting a flexible material between the pluralities of segments of sheets and bonding by use of for example an adhesive the segments together with the flexible material therebetween. This procedure enables one to efficiently cut the correct size segments for each particular construction as desired and eliminates the necessity of precisely cutting only through the sheets of material and not through the flexible material bonded between the sheets. In addition, it simplifies the cutting of the correct bevel or chamfer on each adjoining edge of the segments so that the hinge-like connection formed by the groove and the flexible material will have a freely acting hinge with a minimum of exposed flexible material at each joint.

It will be apparent to those skilled in the art that various modifications and variations can be made in the sheet-like product, corrugated structure, honeycomb structure and the methods of making these products without departing from the scope or spirit of the invention. Thus, it is intended that the present invention cover the modifications and variation of this invention provided they come within the scope of the appended claims and their equivalents.

What is claimed is:

1. A layered sheet-like product comprising:
   (a) two sheets of wood;
   (b) a pliable material between said sheets, said pliable material having a form such that said two sheets may be adhered, one to the other, with said pliable material therebetween;
   (c) means for adhering said sheets together with said pliable material therebetween;
   (d) said wood sheets being compressed around said pliable material to form a unitary product; and
   (e) grooves on at least one side of said product at predetermined locations to facilitate bending said product along said grooves, each of the grooves penetrating only through the sheet on one side of the pliable material.

2. A layered sheet-like product comprising:
   two sheets of wood, each having grooves on one surface and flexible means bonded between said sheets on the surface of said sheets opposite said grooves, said grooves and said flexible means forming hinge-like connections at said grooves, said sheets and said flexible means adhered together, said wood sheets being compressed around said flexible means to lock said flexible means in place and form a unitary product.

3. A corrugated wood structure having a core covered by at least one facing skin, said core being made from the sheetlike product of claim 2 wherein said grooves on each said sheet are at predetermined registering locations on said product, said core having a series of consecutively inverted equilateral trapezoid shaped sections, each said section having one open and one closed nonequilateral side, said sections being formed by bending said product along said grooves and said facing skin being adhered to one side of said series of trapezpoid shaped sections.

4. A corrugated wood structure comprising:
a core and at least one facing skin adhered to said core, said core including at least two sheets of wood bearing parallel grooves on each said sheet at predetermined registering locations for facilitating bending of said sheet and flexible means bonded between said sheets opposite said grooves, said grooves and said flexible means forming hinge-like connections at said grooves, said core being formed by bending said sheet along said grooves into a series of consecutively inverted equilateral triangular shaped sections, each of said sections having an apex in which grooves from two adjacent triangles meet.

5. The corrugated wood structure of claim 3 wherein said flexible layer is one or more flat bands made of one or more of the group consisting of nylon, polyester, polypropylene and rayon.

6. The corrugated wood structure of claim 3 wherein said structure includes two facing skins on opposite sides of said core.

7. A wood honeycomb structure made frim a plurality of sheets of the sheet-like product of claim 2 wherein said grooves on each said sheet are at predetermined registering locations on both sides of said product, each of said plurality of sheets being formed into alternating high and low surfaces by flexing said sheets at said hinge-like connections, each of said sheets being affixed to at least one adjacent sheet at contiguous surfaces between predetermined ones of said grooves to form a series of polygonal cells between adjacent sheets.

8. The corrugated wood structure of claim 3 wherein said flexible layer is a fabric made of one or more of the group consisting of nylon, polyester, polypropylene or rayon.

9. The corrugated wood structure of claim 4 wherein said flexible layer is a fabric made of one or more of the group consisting of nylon, polyester, polypropylene or rayon.

10. The flexible layer of claim 8 wherein the fabric comprising said layer is woven.

11. The corrugated wood structure of claim 4 wherein said flexible layer is one or more flat bands made of one or more of the group consisting of nylon, polyester, polypropylene or rayon.

12. The product of claim 1 wherein said pliable material is a woven fabric.

13. The product of claim 1 wherein said pliable material is a plurality of filaments.

14. The product of claim 13 wherein said filaments are generally perpendicular to said grooves.

15. A honeycomb structure comprising:
(a) a core comprised of a plurality of strip-like members, said members being comprised of two strips of wood having a flexible layer bonded therebetween, said flexible layer having a form such that said two strips may be adhered, directly one to the other around portions of the flexible layer, with said flexible material therebetween, said strips including a plurality of grooves substantially perpendicular to their longitudinal direction for facilitating bending at said grooves, said strip-like members being bent to form alternate high and low surfaces, adjacent bent strip-like members being adhered to one another at said grooves forming an array of cells; and
(b) at least one facing adhered to one side of said array.

16. The honeycomb structure of claim 15 wherein said array has a unit cell in the shape of a figure selected from the group consisting of: a triangle, a square, a pentagon, or a hexagon.

17. The honeycomb structure of claim 15 wherein said flexible layer is one or more bands of nylon or polyester.

18. The honeycomb structure of claim 15 wherein said grooves are regularly spaced and parallel with said facing being perpendicular to said grooves.

19. The flexible layer of claim 17 wherein the flat bands comprising said layer are textured.

20. The honeycomb structure of claim 15 wherein said flexible layer is netting made of one or more of the group consisting of nylon or polyester.

* * * * *